C. Purdy,
Saw Guide.
No. 98,189. Patented Dec. 21, 1869.

Witnesses:
Harry King
C. L. Evert

Inventor:
C. Purdy
per
Alexander Munson
Attys.

United States Patent Office.

C. PURDY, OF BEDFORD, OHIO.

Letters Patent No. 98,189, dated December 21, 1869.

IMPROVEMENT IN SAW-GUIDES.

The Schedule referred to in these Letters Patent and making part of the same.

*To all whom it may concern:*

Be it known that I, C. PURDY, of Bedford, in the county of Cuyahoga, and in the State of Ohio, have invented certain new and useful Improvements in Guides for Band-Saws; and do hereby declare that the following is a full, clear, and exact description thereof, reference being had to the accompanying drawings, and to the letters of reference marked thereon, making a part of this specification.

The object of this invention is to furnish a guide, which may be adjusted to different width and thickness of saws, and made to rotate with the saw, thus preventing friction to the saw, and breakage, to a great extent, which must always occur where the ordinary stationary guides are used.

In order to enable others skilled in the art to which my invention appertains, to make and use the same, I will now proceed to describe its construction and operation, referring to the annexed drawings, in which—

Figure 1:
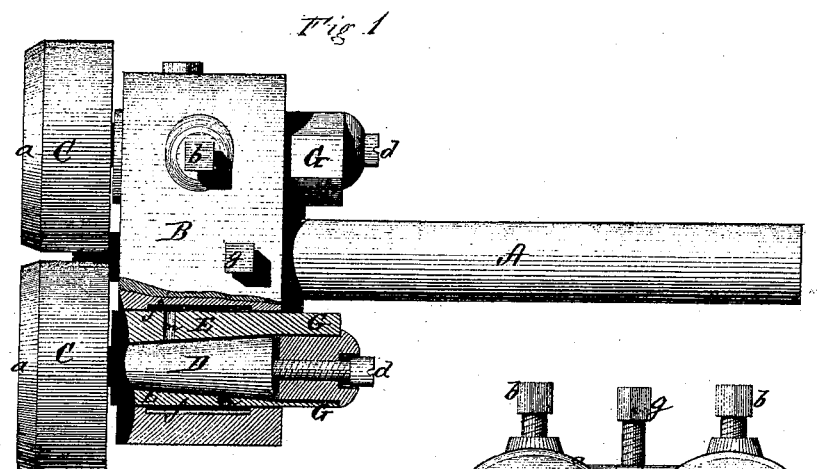
Figure 1 is a plan view, part in section.
Figure 2:
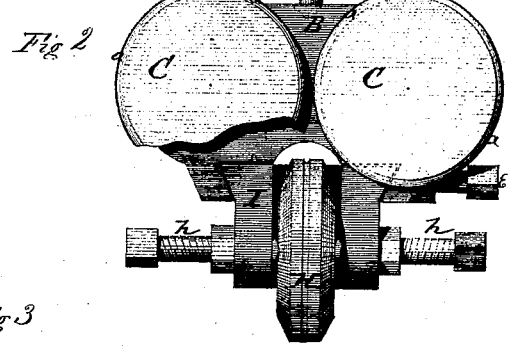
Figure 2 is a front view.
Figure 3:
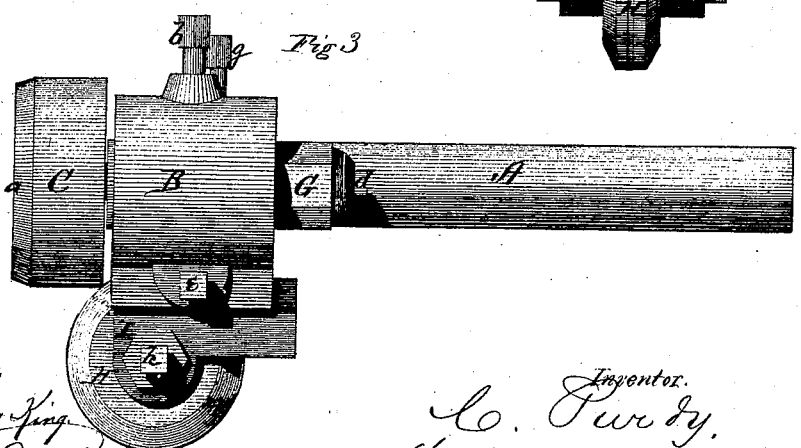
Figure 3 is a side view.

In an upright or vertical bar, suspended above the table of the machine, is attached, by means of a sleeve, the guide-arm A, to which is secured the block B.

Upon the front or face of the block B, are guide-wheels, C C, attached to conical shafts or bearings, D D, on each side of the saw.

The front edges $a$ of these wheels are bevelled, so as to admit the set of saw passing without injury.

These wheels (C C) run in eccentric bushings, E, which are each provided with a square, G, on the back end, for the purpose of being adjusted to the thickness of the saw, which is done by turning the bushings slightly, and securing them in position by a set-screw, $b$, on top.

There are, also, on back end of the bushings E E, screws, $d$ $d$, for the purpose of tightening the conical shafts D D, when worn.

On the lower side, or back of the guide-wheels C C, is another wheel, H, attached to a slide, I, which is adjustable back and forth, and held to place by set-screw $e$ pressing against the side of the slide.

The wheel H is for the back of the saw to run against, and may be moved forward as the width of the saw requires, or so much as to prevent the saw-teeth from bearing against the metal beyond the bevelled edges $a$ $a$ provided for the set, on the upper wheels C C.

This lower guide-wheel has a groove, $i$, cut in its edge, for the purpose of holding the saw centrally, and is pivoted within the slide I, by means of screws $h$ $h$.

Within the block B, around each of the bushings E, is an oil-chamber, $f$, and through the bushings are passages, $m$ $m$, to conduct the oil on to the bearings D D.

The oil is admitted from the top of the block B, through an opening made for that purpose, which opening is closed by a screw, $g$.

The great failure, heretofore, in band-saws, has been in consequence of not having a proper guide to control the saw. With my guide, there is no difficulty; the saw keeps perfectly cold, thereby preventing expansion and slipping from the pulleys.

Having thus fully described my invention,

What I claim as new, and desire to secure by Letters Patent, is—

1. The adjustable guide-wheels C C, for the sides of saw, with the conical bearings D D, made substantially in the manner, and for the purposes specified.

2. The eccentric bearing-boxes E E, provided with screws, or other equivalents, for adjusting the conical bearings D D, and provided with self-oiling devices, all constructed and arranged substantially as and for the purpose specified.

3. The back guide-wheel H, arranged with adjustable slide I, held in position with screw $h$, and provided with groove $i$, substantially in the manner and and for the purposes specified.

In testimony that I claim the foregoing, I have hereunto set my hand and seal, this 11th day of October, 1869.

C. PURDY. [L. S.]

Witnesses:
LINN P. TARBELL,
L. TARBELL.